July 27, 1954     J. P. GLASBY, JR     2,684,667
FORCED AIR FLOW WARM AIR HEATING FURNACE Filed June 26, 1948     6 Sheets-Sheet 1

Fig. 1.

INVENTOR.
JONATHAN P. GLASBY, JR.,
BY Edward T. Connors
ATTORNEY.

July 27, 1954  J. P. GLASBY, JR  2,684,667
FORCED AIR FLOW WARM AIR HEATING FURNACE
Filed June 26, 1948  6 Sheets-Sheet 5

INVENTOR.
JONATHAN P. GLASBY, JR.,
BY Edward T. Connors
ATTORNEY.

– Patented July 27, 1954

2,684,667

UNITED STATES PATENT OFFICE 2,684,667

FORCED AIR FLOW WARM AIR HEATING FURNACE

Jonathan P. Glasby, Jr., Verona, N. Y., assignor to The J. P. Glasby Mfg. Co., Inc., Belleville, N. J.

Application June 26, 1948, Serial No. 35,441

5 Claims. (Cl. 126—110)

The present invention relates to heating devices and particularly to a blower type air heater or warm air furnace having a downwardly directed warm air outlet.

An air heater in accordance with the invention is particularly suitable for use in heating cellarless buildings. In such buildings the space beneath the building is generally small and inaccessible and thus is unsatisfactory for the installation of an air heating device. Accordingly the device is often installed above the level of the floor so as to be accessible. It is thus important that the device be relatively small and present a pleasing appearance, and further, that the heater have an efficient distribution of heating surface in order to add to its economy. Prior devices have, in many instances, been constructed so that the heater pipes have extended outwardly from the upper portion thereof resulting in excessively warm ceilings and cold floors.

Other devices have had the heating pipes brought from the top of the heater down along the sides thereof to an under floor distribution center. While such units have provided a better heat distribution they have been often unsightly because of the downwardly directed pipes, which also are objectionable as they require considerable floor area. Another disadvantage is that the downwardly directed heater pipes lose considerable heat by radiation necessitating expensive and generally unsightly insulation.

The present invention aims to provide an air heater of improved construction which overcomes the foregoing difficulties and disadvantages.

Another object of the invention is to provide an air heater or warm air furnace which is simple and economical in manufacture, efficient in operation and durable in use.

In accordance with the invention the foregoing objects are accomplished by providing an air heater which is adapted to be placed on the floor level or above the ceiling of a building to be heated. The heater is made with a warm air blower having a downwardly directed warm air outlet. The construction of the heater is such that the blower and its outlet are positioned in the hottest part thereof and are almost completely surrounded by the hot combustion gases. An inner shell confines the combustion gases against the outer walls of the blower and its outlet. The cold air to be heated in turn almost completely surrounds the inner shell, the air thus being preheated before entering the blower and also acting as an insulating medium so that practically no heat is lost from the walls or top of the heater. The plenum is positioned under the heater and thus completes the insulation thereof. More specifically the blower is located so as to form the roof of the combustion chamber while the downwardly directed blower outlet forms one wall of the combustion chamber. By means of the inner shell the hot combustion gases are directed over the top of the blower casing and downwardly along its sides thence upwardly against the inner surface of the shell and upwardly out the outlet, thus the combustion gases practically completely surround the blower casing. The air to be heated is directed over practically the entire outer surface of the shell and into the blower, thus becoming preheated before entering the blower and acting as an insulating medium to prevent heat from escaping into the space in which the heater is located. Another feature of the air heater is its construction permitting the blower and its motor to be removed from the front thereof as a unitary assembly without access being had to the sides or rear thereof. Likewise, the heating unit may be easily inserted or removed from the front of the heater.

The heater in accordance with the invention is advantageous in that it may be placed in corners or in available cupboard space or the like yet its moving parts are readily accessible from the front for servicing or repairs. A minimum of floor space is occupied by reason of its compact construction which is easily adapted to a pleasing design. The heater is adapted to use a heating unit burning gas, oil or other suitable fuels without expensive alterations in its construction. By reason of its extended flue travel the flue gases are discharged from the heater at a low temperature resulting in a very efficient unit.

Other objects and advantages of the invention will be apparent from the following description and from the accompanying drawings which show, by way of example, an embodiment of the invention.

Referring to the drawings there is shown an air heating device or warm air furnace 10 in accordance with the invention. The heater includes a housing 11 having therein a heat exchanger including a fire box or combustion chamber 12. The roof of the fire box is formed by an involute surface 14 of a blower casing 15. One of the side walls of the combustion chamber is formed by inner wall 16 of the downwardly directed outlet 17 of the blower casing. The other walls of the fire box are formed by an inner shell 19 enclosing the blower casing 15 and separating combustion gases and air to be heated. A blower fan 20 is positioned in the blower casing 15 to expel the warmed air downwardly into a plenum 21 positioned under base 22 of the heater for the distribution of the warmed air throughout a building or other space.

The combustion chamber 12 is adapted to receive any conventional heating unit 23 adapted to burn oil, gas, or other suitable fuel. The walls of the combustion chamber are formed of any appropriate material, such as sheet steel, adapted to separate the combustion gases from the air to be heated and to provide efficient heat transmission therebetween. The inner shell 19 is made in any conventional manner such as by attaching sheet metal partitions together by welding or other suitable means.

Figure 2:
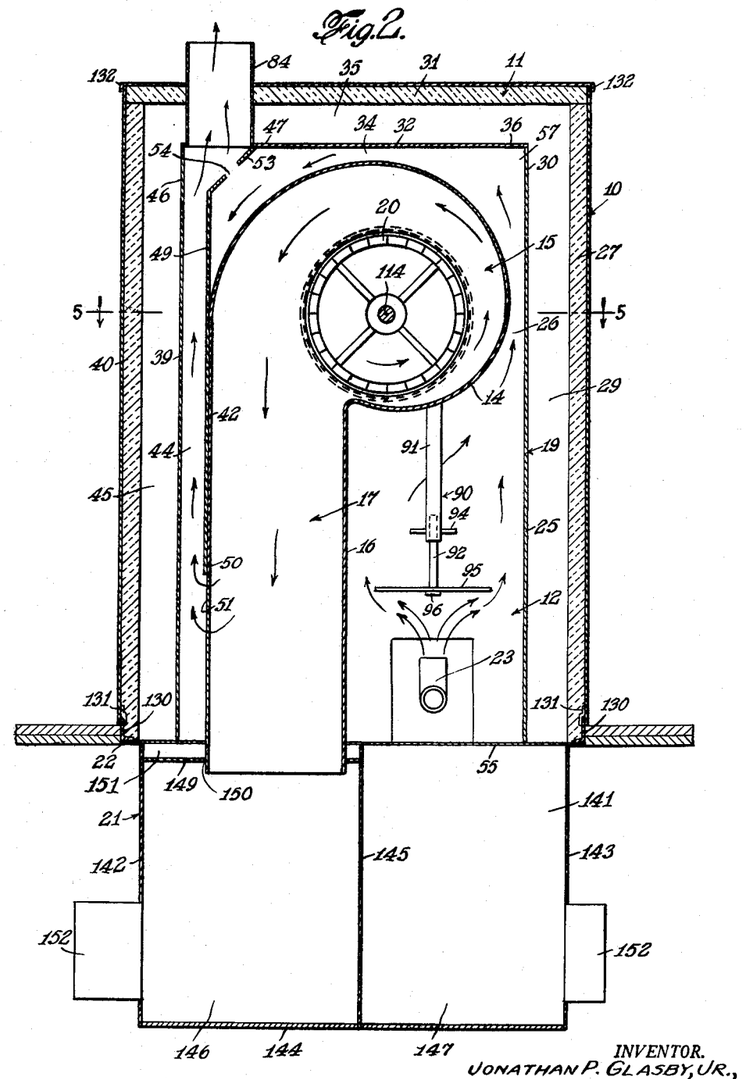
Figure 2 is a front vertical sectional view of the warm air furnace taken along the lines 2—2 of Figures 4 and 5, the path of the combustion gases being shown by the use of arrows.

As may be seen in Figure 2, a vertically extending partition 25 forms one wall of the shell 19 and is spaced from the involute surface 14 of the blower casing to define combustion gas passage 26, and spaced from side wall 27 of the housing 11 to define an air passage 29. Upper end 30 of the partition 25 is terminated a predetermined distance below the inner surface of top 31 of the housing 11. A horizontally extending partition 32 is positioned above the involute surface 14, one end 36 thereof meeting upper end 30 of the vertically extending partition 25. The partition 32 is spaced from the involute surface 14 to define combustion gas passage 34, and spaced below the inner surface of the housing top 31 to form an air passage 35. A second vertically extending partition 39 is spaced between side wall 40 of the housing 11 and outer wall 42 of the blower outlet 17 to form a combustion gas passage 44 with the blower wall 42, and to form an air passage 45 with the housing wall 40. Upper end 46 of the partition 39 abuts against end 47 of the horizontally extending partition 32. A baffle or partition 49 has its lower end 50 attached to the blower outlet wall 42, its upper end 53 being turned inwardly and abutting against the under surface of end 47 of the partition 32. The width of the baffle 49 is greater than the width of the blower wall 42 so that the baffle will abut against front and rear walls to be later described and its length is such as to provide combustion gas passages 51 between its lower edge and the base 22. The baffle upper end 53 is apertured as indicated at 54 to vent the combustion gas passage 34 as will hereinafter appear.

Figure 1:
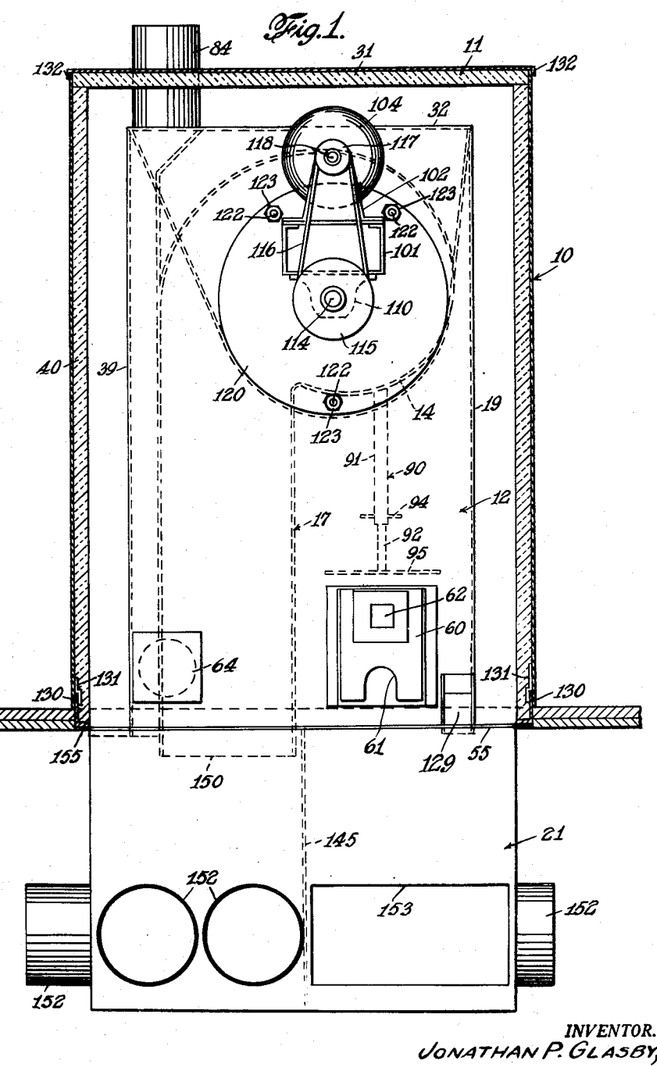
Figure 1 is a front elevation of a warm air furnace in accordance with the invention with decorative front wall removed. Certain of the interior partitions are shown in dotted lines.
Figure 4:
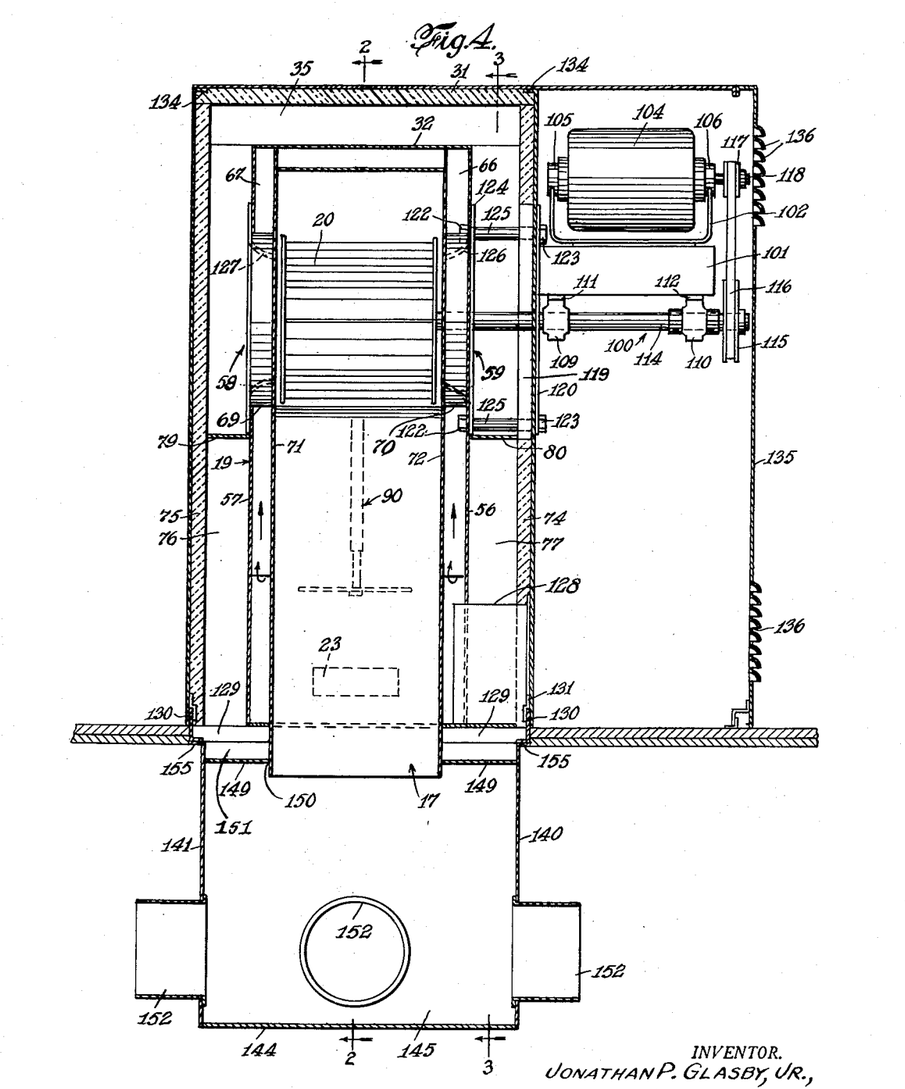
Figure 4 is a central vertical sectional view of the furnace taken along the line 4—4 of Figure 5.

The enclosure of the shell 19 forming the combustion chamber 12 is completed by a floor 55 and by front and rear walls or partitions 56 and 57 (Fig. 4). Both of the walls 56 and 57 extend upwardly to meet the edges of the horizontally extending partition 32 and both formed with openings to provide blower casing inlets 58 and 59. The inlet openings are made of a size to permit the insertion of the blower fan 20. A door 60 (Fig. 1) is made in the front combustion chamber wall 56 and may be formed with an opening 61 providing a passage for air to support the fuel combustion and for a fuel pipe (not shown). A transparent window 62 is placed in the door 60 in order that the flame may be viewed from the front of the heater. A cleanout door 64 may also be made in the front wall 56.

The front and rear inner shell walls 56 and 57 are spaced from the sides of the blower outlet 17, to provide combustion gas passages 66 and 67 which are blocked off from the blower inlets 58 and 59 by cylindrically shaped barriers 69 and 70, abutting on their inner ends against blower walls 71 and 72 about openings therein for the inlets 58 and 59, and abutting on their outer ends against the walls 56 and 57 about the blower inlet openings therein. The front and rear inner shell walls 56 and 57 are spaced from front and rear housing walls 74 and 75 to provide air passage spaces 76 and 77. In order that the air entering the blower inlets 58 and 59 will be forced to pass over the outer walls of the shell 19 to be preheated before entering the blower, generally U-shaped partitions or barriers 79 and 80 are interposed, respectively, between the housing walls 74 and 75, and the inner shell walls 56 and 57, with the legs of the barriers turned upwardly and terminating approximately at the upper corners of the inner shell 19. The bottoms of the U-shaped members 79 and 80 extend slightly below the blower inlets 58 and 59, the air passages formed by the upwardly turned members 79 and 80 being indicated by 81 and 82.

A combustion gas outlet or stack 84 is provided extending through an aperture in the top housing wall 31 and through an aperture 85 in the horizontally extending inner shell partition 32. The inwardly turned upper end 53 of the barrier 49 provides clearance for the combustion gases to pass from the combustion gas passage 44 through the outlet 84.

In order that the combustion gases in the combustion chamber 12 will be distributed against the various surfaces of the blower casing 15 and its outlet 17, an adjustable barrier 90 is placed on the combustion chamber and includes a supporting hollow member 91 attached at its upper end to the underside of the involute blower surface 14. A lower supporting member 92 is adapted to fit into the lower end of the upper supporting member 91 and may be adjustably positioned by a pin 94 extending through a plurality of aligned apertures in the supporting members 91 and 92. A baffle plate 95 of any desired configuration is attached to the lower end of the supporting member 92 in any suitable manner such as by a bolt 96.

Figure 7:
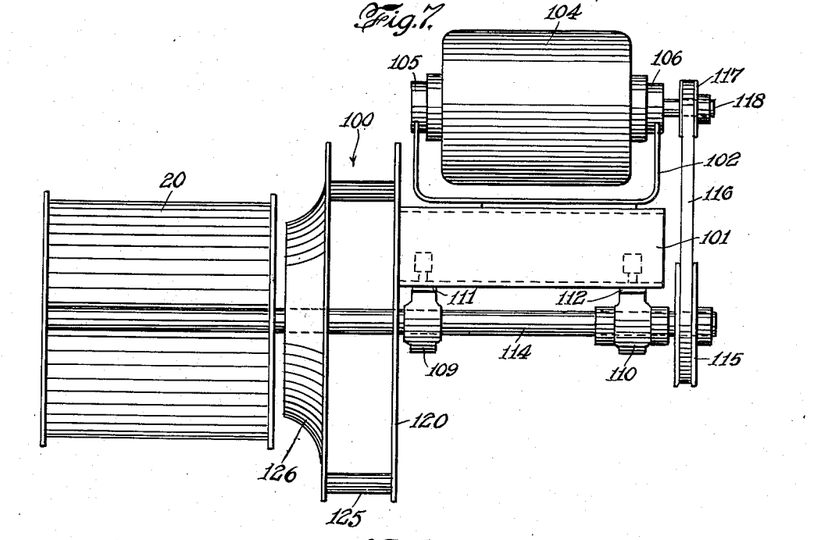
Figure 7 is a side view at an enlarged scale of the detachable blower assembly.
Figure 8:
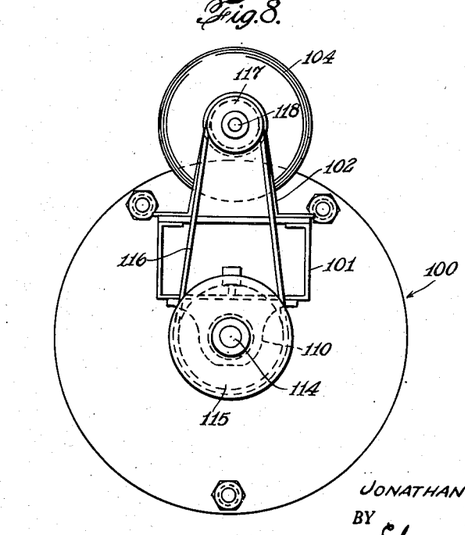
Figure 8 is an end view corresponding to Figure 7.

A detachable blower assembly 100 is adapted to be positioned so as to be removable from the front of the heater 10. A frame 101 carries on its upper surface a motor mounting arm 102 supporting a motor 104 through vibration resisting mountings 105 and 106. On the lower surface of the frame 101 are carried bearing members 109 and 110 through vibration resisting members 111 and 112. A blower shaft 114 is journalled in the bearing members 109 and 110 and carries a driven pulley 115 at its outer end and the blower fan 20 at its inner end. The driven pulley is rotated by a belt 116 engaging with a driving pulley 117 carried by motor shaft 118.

The front housing wall 74 is formed with an opening 119 adapted to receive the blower fan 20. A cover plate 120 to cover the opening 119 is secured to the end of the frame 101 and apertured to receive the blower shaft 114. The cover plate 120 is apertured to receive bolts having their inner ends 122 secured to the front shell wall 56, nuts 123 engage the ends of the bolts to secure the blower assembly in position. A blower funnel 126 is attached to the cover plate 120 by tubular members 125 in a welded assembly. A blower funnel 127 corresponding to the blower funnel 126 is attached to the rear shell wall 57 about the blower inlet 58.

A tubular member 128 is positioned in an opening in the lower end of the housing wall 74 to provide an air passage from the front of the heater through the door 60 to the combustion chamber 12.

The heater 10 has attached connecting members or straps 129 adapted to be received in an angle iron frame 130 which may be attached to the floor of the building. The housing walls 27, 40, 74 and 75 (Fig. 4) are easily attached to the edge of the angle iron frame 130 in any suitable manner, such as by clips 131. The housing top 31 has a flanged edge 132 adapted to overlie the top ends of the walls 27 and 40, while the walls 74 and 75 have flanged edges 134 adapted to engage with the top 31. Screws, bolts, or other conventional means may be used to hold the walls in position. A front cover 135 with flanged openings 136 is provided to cover the blower motor and burner assembly, the air for the combustion chamber 12 entering through the flanged openings 136. The outer walls 27, 40, 74, 75 and the top 31 of the outer housing 11 may be made of any suitable material such as sheet metal, and may be made with double walls, either with or without insulating material therebetween.

Figure 6:
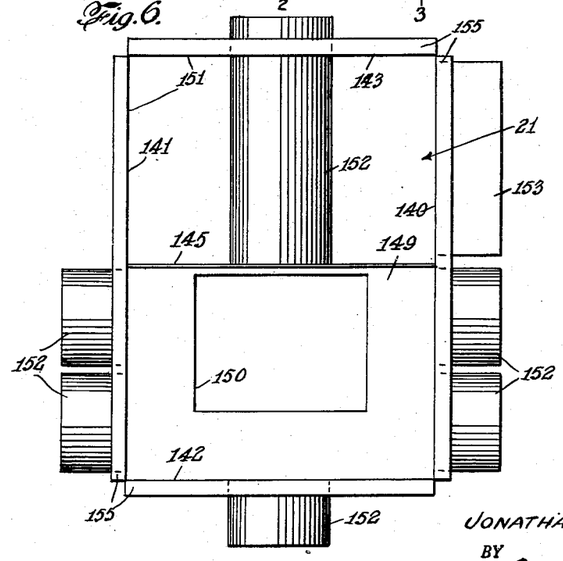
Figure 6 is a plan view of the plenum positioned under the furnace.

The plenum 21 is positioned under the base 22 of the heater and is preferably of rectangular shape with front and rear walls 140 and 141, and with side walls 142 and 143. The plenum bottom 144 is closed. A partition 145 divides the plenum into a warm air compartment 146 and a cold air or return air compartment 147. The warm air compartment 146 is closed by a top 149 having an opening 150 to receive the end of the downwardly directed blower outlet 17. The top of the cold air compartment is open to permit the cold air to flow upwardly over the plenum top 149 which is spaced below the heater bottom providing an air passage 151 so that the air may flow into the various air passages about the shell 19. The plenum walls are apertured to receive fittings 152 adapted to connect with the warm air conduits of the building. A cold air fitting 153 is adapted to be connected to cold air conduits returning air from the building. The upper edges of the plenum walls are flanged as indicated at 155 to engage with the angle iron frame 130 for the support of the plenum.

Figure 5:
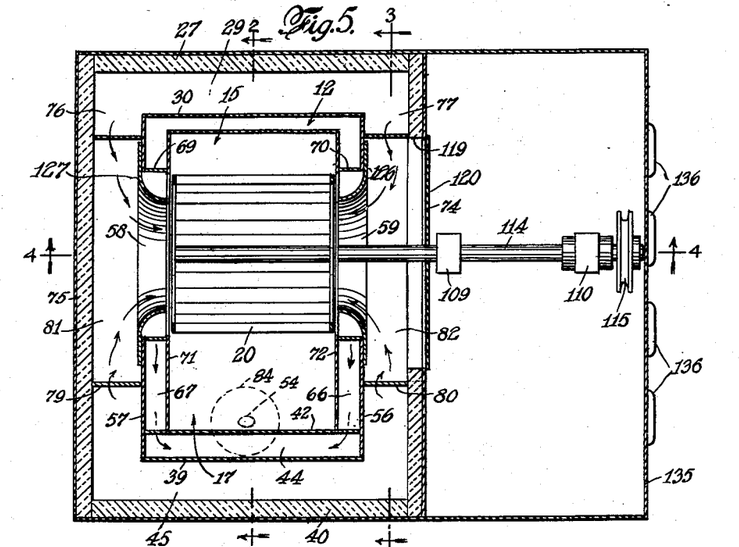
Figure 5 is a horizontal sectional view of the furnace taken approximately along the lines 5—5 of Figures 2 and 3.

The path of the combustion gases is shown in Figures 2, 4 and 5. The air to support combustion enters the heater through the flanged openings 136 and the tubular member 128 into the combustion chamber 12 through its door 60. As may be seen in Figure 2 the combustion gases flow upwardly through the combustion gas passages 26 and 34 over the top of the blower casing 15, then are directed towards the sides and downwardly by the baffle 53 along the sides of the blower outlet 17 in the combustion gas passages 66 and 67 (Figure 5), around the baffle lower ends 50, in the combustion gas passages 51, thence upwardly through the combustion gas passage 44 and out of the heater through the stack 84. The aperture 54 being provided to vent the combustion gas passage 34 from any leakage of gas from the heating unit 23 while the heater is not being operated. The combustion gases thus have an extended flue travel practically completely covering the outer surface of the blower casing 15, its outlet 17, and the inner surface of the shell 19.

Figure 3:
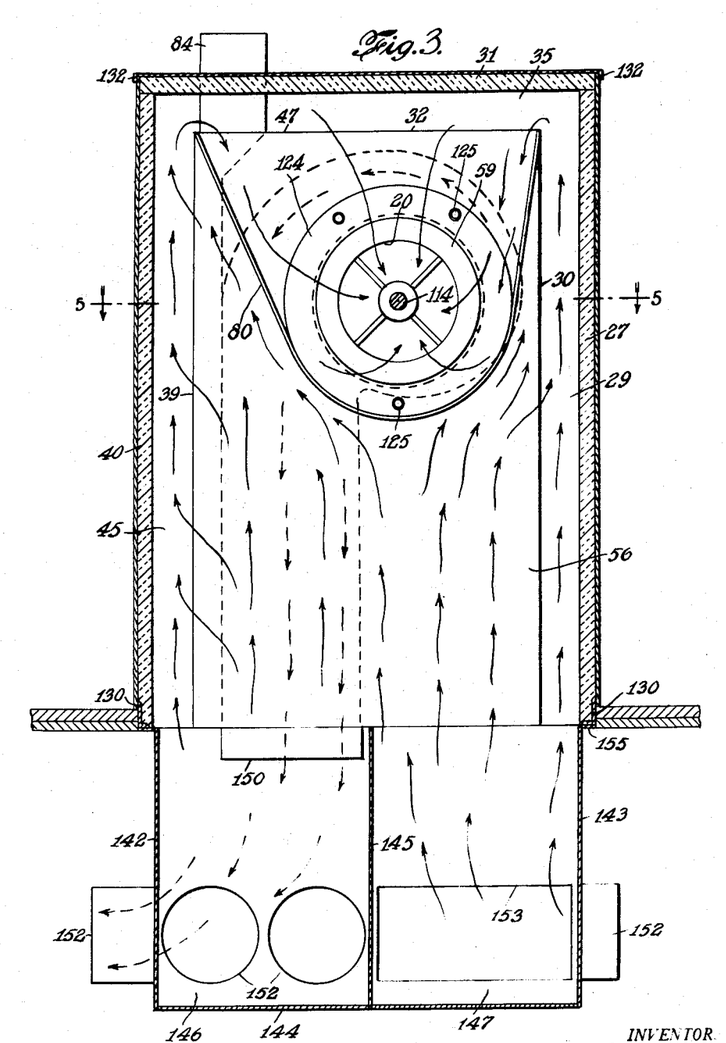
Figure 3 is a view corresponding to Figure 2 taken along the lines 3—3 of Figures 4 and 5, the paths of the air to be heated outside of the blower being shown by full arrows, while the air in the blower casing is shown by dotted arrows.

The path of the air to be heated is shown in Figures 3, 4 and 5. The air enters through the opening 153 to the cold air compartment 147 of the plenum 21 and is drawn upwardly and across through the air passage 151 and upwardly through the air passages 29, 45, 76 and 77 (between all four outer sides of the inner shell 19 and the inner walls of the housing 11), over the top 32 of the inner shell 19, and downwardly into the air passages 81 and 82 into the blower inlets 58 and 59. The air has already been preheated by its contact with the outer surfaces of the inner shell 19 and is further heated inside the blower casing 15. The air is expelled through the blower outlet 17 by the blower fan 20, and is still further heated as it passes through the blower outlet 17 into the warm air compartment 146 of the plenum 21. The warmed air is thus finally heated in the hottest part of the heater and discharged therefrom without loss of heat.

It is thus apparent that an air heating device or warm air furnace has been provided which is efficient, compact and adaptable for rugged use. The heater may be placed on the floor of a building or in the attic space over the ceiling. The unit radiates practically no heat through its walls and thus may be placed adjacent the building walls without danger of overheating the walls and causing fire. The heater is readily serviceable from the front thereof and thus is particularly adaptable for use in small spaces such as cupboards or the like.

While the invention has been described and illustrated with reference to a specific embodiment thereof, it will be understood that other embodiments may be resorted to without departing from the invention. For example, while the inner shell 19 has been described as being rectangular it might equally well be made circular in shape. Likewise, the position of the stack 84 is shown as at the top of the heater, while obviously, it might alternatively be placed on the upper sides of the heater. Likewise, various shapes of blower casings might alternatively be used. Therefore, the form of the invention set out above should be considered as illustrative and not as limiting the scope of the following claims.

I claim:

1. In an air heating device, a housing, a combustion gas outlet adjacent the top of the housing, a blower casing positioned within the housing and having an inlet, a warm air blower in the blower casing, the blower casing including an involute surface about the periphery of the blower and a downwardly directed warm air blower outlet, a first vertically extending partition positioned between one end wall of the housing and the involute surface of the blower casing and spaced therebetween, a horizontally extending partition having one end meeting the upper end of the first vertical partition and spaced between the top wall of the housing and the top of the blower casing, a second vertically extending partition at its upper end meeting the other end of the horizontally extending partition and at its lower end meeting the bottom of the housing and spaced between the other end wall of the housing and the blower outlet, a pair of vertically extending side partitions each spaced from its side wall of the housing and each abutting against the edges of the first and second vertical partitions and against the sides of the horizontally extending partition, at least one of the side walls having an opening therein providing fluid communication with the inlet of the blower forming an air inlet for air to be heated entering from the outer side of the side wall, the blower inlet fitting the opening to prevent fluid flow from the inner side of the side wall into the blower, and a partitioned plenum chamber under the housing, one part of the plenum chamber for cold air and a second part of the plenum chamber for warm air, inlet and outlet means for both parts of the plenum chamber, the space inside the horizontal and vertical partitions and the outer surface of the blower outlet defining a combustion chamber with the involute surface of the blower extending across the top center of the combustion chamber, the space within the housing outside the horizontal and vertical partitions leading from the outlet of the cold air part of the plenum chamber, the blower outlet communicating with the inlet of the warm air part of the plenum chamber so that air is passed between the inner walls of the housing and the outer walls of the partitions thence into the blower where it is further warmed by contact with the inner wall of the involute surface thence passed downwardly through the blower outlet to be superheated by the wall of the blower outlet forming part of the combustion chamber and thence expelled into the inlet of the warm air part plenum chamber.

2. In an air heating device, a housing, a combustion gas outlet adjacent the top of the housing, a blower casing positioned within the housing and having an inlet, a warm air blower in the blower casing, the blower casing including an involute surface about the periphery of the blower and a downwardly directed warm air blower outlet, a first vertically extending partition positioned between one end wall of the housing and the involute surface of the blower casing and spaced therebetween, a horizontally extending partition having one end meeting the upper end of the first vertical partition and spaced between the top wall of the housing and the top of the blower casing, a second vertically extending partition at its upper end meeting the other end of the horizontally extending partition and at its lower end meeting the bottom of the housing and spaced between the other end wall of the housing and the blower outlet, a pair of vertically extending side partitions each spaced from its side wall of the housing and each abutting against the edges of the first and second vertical partitions and against the sides of the horizontally extending partition, at least one of the side walls having an opening therein providing fluid communication with the inlet of the blower forming an air inlet for air to be heated entering from the outer side of the side wall, the blower inlet fitting the opening to prevent fluid flow from the inner side of the side wall into the blower, a generally U-shaped partition having its legs connected with the upper side portions of the vertically extending side partitions and positioned between the housing and a side partition about the opening therein and with the legs thereof extending upwardly, the ends of such legs being spaced from the top of the housing, and a partitioned plenum chamber under the housing, one part of the plenum chamber for cold air and a second part of the plenum chamber for warm air, inlet and outlet means for both parts of the plenum chamber, the space inside the horizontal and vertical partitions and the outer surface of the blower outlet defining a combustion chamber with the involute surface of the blower extending across the top center of the combustion chamber, the space within the housing outside the horizontal and vertical partitions leading from the outlet of the cold air part of the plenum chamber, the blower outlet communicating with the inlet of the warm air part of the plenum chamber so that air is passed between the inner walls of the housing and the outer walls of the partitions thence across the top of the horizontally extending partition over the U-shaped partition into the blower where it is further warmed by contact with the inner wall of the involute surface thence passed downwardly through the blower outlet to be superheated by the wall of the blower outlet forming part of the combustion chamber and thence expelled into the inlet of the warm air part plenum chamber.

3. In an air heating device, a housing, a combustion gas outlet adjacent the top of the housing, a blower casing positioned within the housing and having an inlet, a warm air blower in the blower casing, the blower casing including an involute surface about the periphery of the blower and a downwardly directed warm air blower outlet, a first vertically extending partition positioned between one end wall of the housing and the involute surface of the blower casing and spaced therebetween, a horizontally extending partition having one end meeting the upper end of the first vertical partition and spaced between the top wall of the housing and the top of the blower casing, a second vertically extending partition at its upper end meeting the other end of the horizontally extending partition and at its lower end meeting the bottom of the housing and spaced between the other end wall of the housing and the blower outlet, a pair of vertically extending side partitions each spaced from its side wall of the housing and each abutting against the edges of the first and second vertical partitions and against the sides of the horizontally extending partition, at least one of the side walls having an opening therein providing fluid communication with the inlet of the blower forming an air inlet for air to be heated entering from the outer side of the sidewall, the blower inlet fitting the opening to prevent fluid flow from the inner side of the sidewall into the blower, a generally U-shaped partition having its legs connected with the upper side extending portions of the vertically side extending partitions and positioned between the housing and a side partition about the opening therein and with the legs thereof extending upwardly, the ends of such legs being spaced from the top of the housing, a baffle partition interposed between the second vertical partition and the blower casing outlet terminating short of the housing bottom, an outlet for combustion gases communicating with the space between the second vertical partition and the baffle partition to lead combustion gases downwardly and under the edge of the baffle to increase the length of pass for the combustion gases about the blower outlet, and a partitioned plenum chamber under the housing, one part of the plenum chamber for cold air and a second part of the plenum chamber for warm air, inlet and outlet means for both parts of the plenum chamber, the space inside the horizontal and vertical partitions and the outer surface of the blower outlet defining a combustion chamber with the involute surface of the blower extending across the top center of the combustion chamber, the space outside the horizontal and vertical partitions leading from the outlet of the cold air part of the plenum chamber, the blower outlet communicating with the inlet of the warm air part of the plenum chamber so that air is passed between the inner walls of the housing and the outer walls of the partitions thence across the top of the horizontally extending partition over the U-shaped partition into the blower where it is further warmed by contact with the inner wall of the involute surface thence passed downwardly through the blower outlet to be superheated by the wall of the blower outlet forming part of the combustion chamber and thence expelled into the inlet of the warm air part plenum chamber.

4. In an air heating device, a housing, means providing a combustion chamber disposed within the housing, means to heat the combustion chamber, inlet and outlet means for the combustion chamber, an air heating blower having an involute casing disposed within the combustion chamber, the blower having its outlet directed downwardly, a plenum chamber under the housing, partition means to separate the plenum chamber into cold air and warm air parts, inlet and outlet means for both parts of the plenum chamber, means providing a fluid passage from the outlet of the cold air part of the plenum chamber to the space defined between the inside of the housing and the outside of the combustion chamber, and means providing an air passage through the wall of the combustion chamber into the blower inlet, the involute surface of the blower extending over the heating means for the combustion chamber, the blower outlet extending downwardly at one side of the combustion chamber to exhaust into the inlet of the warm air part of the plenum chamber.

5. In an air heating device, a housing, means providing a combustion chamber disposed within the housing, means to heat the combustion chamber, inlet and outlet means for the combustion chamber, an air heating blower having an involute casing disposed within the combustion chamber, the blower having its outlet directed downwardly, a plenum chamber under the housing, partition means to separate the plenum chamber into cold air and warm air parts, inlet and outlet means for both parts of the plenum chamber, means providing a fluid passage from the outlet of the cold air part of the plenum chamber to the space defined between the inside of the housing and the outside of the combustion chamber, means providing an air passage through the wall of the combustion chamber into the blower inlet, the involute surface of the blower extending over the heating means for the combustion chamber, the blower outlet extending downwardly at one side of the combustion chamber to exhaust into the inlet of the warm air part of the plenum chamber, and a baffle member within the combustion chamber extending downwardly towards the bottom of the housing and positioned adjacent the blower outlet so that the path of the combustion gases is around the lower end of the baffle so that the outer surface of the blower outlet is swept by the combustion gases as the gases pass out the combustion chamber outlet.

References Cited in the file of this patent

UNITED STATES PATENTS

| Number | Name | Date |
| --- | --- | --- |
| Re. 22,482 | Schueder | May 16, 1944 |
| 629,740 | Brown | July 25, 1899 |
| 2,037,998 | Norquist | Apr. 21, 1936 |
| 2,053,036 | Jones | Sept. 1, 1936 |
| 2,115,057 | Anderson | Apr. 26, 1938 |
| 2,245,586 | Holmann | June 17, 1941 |
| 2,258,790 | Murphy | Oct. 14, 1941 |
| 2,307,283 | Lonergan | Jan. 5, 1943 |
| 2,330,122 | Higley | Sept. 21, 1943 |
| 2,361,545 | Higley | Oct. 31, 1944 |
| 2,364,698 | Davin | Dec. 12, 1944 |

FOREIGN PATENTS

| Number | Country | Date |
| --- | --- | --- |
| 599,523 | Germany | July 4, 1934 |